United States Patent [19]

Asano

[11] Patent Number: 5,204,822
[45] Date of Patent: Apr. 20, 1993

[54] SEWING DATA PROCESSING APPARATUS
[75] Inventor: Fumiaki Asano, Nagoya, Japan
[73] Assignee: Brother Kogyo Kabushiki Kaisha, Nagoya, Japan
[21] Appl. No.: 650,234
[22] Filed: Feb. 4, 1991
[30] Foreign Application Priority Data
 Feb. 13, 1990 [JP] Japan .................................. 2-31823
[51] Int. Cl.$^5$ ............................................. G06F 15/46
[52] U.S. Cl. ................................ 364/470; 112/121.11
[58] Field of Search .................. 364/470; 112/121.11, 112/121.12, 266.1

[56] References Cited
U.S. PATENT DOCUMENTS

4,982,674 1/1991 Hayakawa ...................... 112/121.12
5,054,408 10/1991 Hayakawa ........................ 112/266.1

Primary Examiner—Jerry Smith
Assistant Examiner—Paul Gordon
Attorney, Agent, or Firm—Oliff & Berridge

[57] ABSTRACT

An apparatus for processing sewing data necessary to sew an embroidery in an area consisting of blocks, by filling with stitches each of the blocks in a sewing direction from a sewing start segment toward a sewing end segment, the sewing start and end segments being defined by, and between, a pair of first points and a pair of second points, respectively, the first and second points being determined on an outline of the each block, the apparatus including a first device obtaining first information relating to a length of a first straight line segment connecting between one of the two first points and one of the two second points, and a length of a second straight line segment connecting between the other first point and the other second point, the first and second straight line segments intersecting each other, a second device obtaining second information relating to a length of the each block in the sewing direction, and a third device producing the sewing data by utilizing the first information, the second information, and third information relating to a number of stitches formed per unit length which number is predetermined for the embroidery.

9 Claims, 6 Drawing Sheets

| R | K |
|---|---|
| 1 ≤ R < 2 | 1 / 1.0 |
| 2 ≤ R < 5 | 1 / 1.5 |
| 5 ≤ R < 9 | 1 / 2.0 |
| 9 ≤ R < 13 | 1 / 2.5 |
| 13 ≤ R < 17 | 1 / 3.0 |
| 17 ≤ R | 1 / 5.0 |

SEWING DIRECTION →

FIG. 5A

SEWING DIRECTION →

SEWING DATA PROCESSING APPARATUS

BACKGROUND OF THE INVENTION

1. Field Of The Invention

The present invention relates to an apparatus for processing sewing data utilized by a sewing machine to automatically form an embroidery on a workfabric.

2. Related Art Statement

There is known an apparatus which produces sets of stitch-position data by utilizing a small amount of given information, namely, sets of position data indicative of the coordinates of the vertices of each of the elementary blocks of an embroidery area, and a stitch density, i.e., number of stitches formed in unit length, so that a sewing machine produces an embroidery in the embroidery area by forming stitches at the stitch positions in each of the blocks which positions are indicated by the sets of stitch-position data. An example of the apparatus is disclosed in U.S. Pat. No. 4,388,883.

Figure 6A:
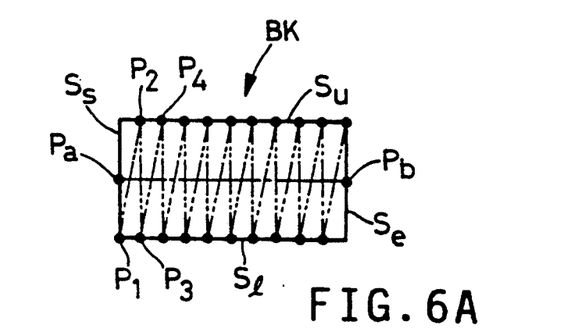
FIG. 6(A) is a view explaining the manner in which stitch positions at which stitches are formed to fill a block, are determined.

Regarding a block BK shown in FIG. 6A, the apparatus of the above-indicated type first determines a length of a straight line segment connecting between respective middle points $P_a$ and $P_b$ on sewing start and end sides $S_s$ and $S_e$ of block BK, and subsequently determines a number of stitches formed in block BK, by multiplying the determined length by a given stitch density (i.e., number of stitches per unit length). Further, the apparatus determines stitch positions $P_1$, $P_2$, . . . on upper and lower sides $S_u$ and $S_l$ of block BK, by utilizing the determined number of stitches, and produces sets of stitch-position data each of which is indicative of the position of a corresponding one of the determined stitch positions.

Figure 6B:
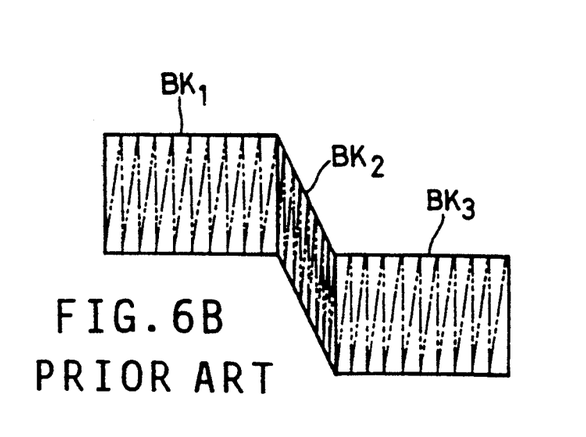
FIG. 6(B) is a view explaining the manner in which an embroidery area is embroidered according to sewing data produced by the prior art apparatus.

In the event, however, that the above apparatus is operated for adjacent three blocks $BK_1$, $BK_2$ and $BK_3$ shown in FIG. 6B, wherein blocks $BK_1$, $BK_2$ are a rectangle and block $BK_3$ is a parallelogram, an "apparent" density of stitches, namely, stitch density perceived by a human being, regarding block $BK_2$, is higher than that regarding block $BK_1$ or $BK_3$ adjacent to block $BK_2$. In other words, the apparent stitch density in block $BK_2$ is not uniform with that in block $BK_1$ or $BK_3$.

There is known another apparatus which determines, regarding a parallelogram block, the distance between the sewing start and end sides of the block, and determines a number of stitches formed in the block, by utilizing the determined distance. This type of apparatus is disclosed in Publication No. 1-158993 of unexamined Japanese Patent Application filed by the Assignee of the present U.S. patent application.

Figure 6C:
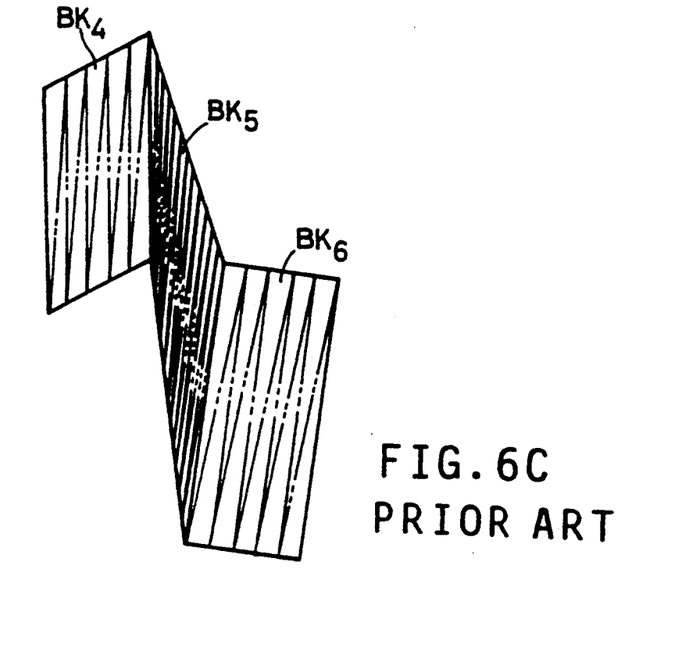
FIG. 6(C) is a view explaining the manner in which an embroidery area is embroidered according to sewing data produced by another prior art apparatus.

The above indicated, second apparatus is adapted to deal with a block whose sewing start and end sides are parallel to each other, or a parallelogram or rectangle block. Accordingly, regarding parallelogram block $BK_4$ and rectangle block $BK_6$ shown in FIG. 6C, the apparatus determines the distance between the sewing start and end sides of each of the blocks and produces sewing data necessary to form stitches in the each block. Sewing data consist of sets of stitch-position data indicative of the positions of stitches formed on the upper and lower sides of a block which sides are different from the sewing start and end sides of the block. However, regarding block $BK_5$ of FIG. 6C, the apparatus fails to determine the distance therefor, since block $BK_5$ is not a parallelogram or rectangle. Thus, in the case of dealing with a block whose sewing start and end sides are not parallel to each other, the second apparatus fails, like the previously indicated first apparatus, to produce sewing data which results in forming stitches in the block such that the apparent stitch density in the block is uniform with that of one or two blocks adjacent to the block. Regarding block $BK_5$ of FIG. 6C, the second apparatus produces sewing data which results in forming stitches in the block as indicated in two-dot chain line in the figure. As can be seen from FIG. 6C, the apparent stitch density in block $BK_5$ lacks harmony with that in adjacent parallelogram or rectangle block $BK_4$ or $BK_6$.

SUMMARY OF THE INVENTION

It is therefore an object of the present invention to provide a sewing data processing apparatus capable of producing, irrespective of the shape of a block, sewing data which results in forming stitches in the block such that the apparent stitch density in the block is harmonious with that in one or more blocks adjacent to the block in an embroidery area.

The above object has been achieved by the present invention, which provides an apparatus for processing sewing data necessary to sew an embroidery in an area consisting of a plurality of blocks, by filling with stitches each of the blocks in a sewing direction from a sewing start segment toward a sewing end segment, the sewing start and end segments being defined by, and between, a pair of first points and a pair of second points, respectively, the first and second points being determined on an outline of the each block, the apparatus comprising (a) first means for obtaining first information relating to a length of a first straight line segment connecting between one of the two first points defining the sewing start segment and one of the two second points defining the sewing end segment, and a length of a second straight line segment connecting between the other first point and the other second point, the first and second straight line segments intersecting each other, (b) second means for obtaining second information relating to a length of the each block in the sewing direction in which the filling of the each block with the stitches is advanced from the sewing start segment toward the sewing end segment, and (c) third means for producing the sewing data by utilizing the first information, the second information, and third information relating to a number of stitches formed per unit length which number is predetermined for the embroidery.

In the sewing data processing apparatus constructed as described above, the first means obtains first information relating to a length of a first straight line segment connecting between one of the two first points defining the sewing start segment and one of the two second points defining the sewing end segment, and a length of a second straight line segment connecting between the other first point and the other second point, which second straight line segment intersects the first straight line segment. The first information is indicative of a degree of deformation of a block from a reference block. The reference block may be a quadrangle whose two diagonals have the same length.

The second means obtains second information relating to a length of the each block in the sewing direction, and the third means produces the sewing data by utilizing the first information, the second information, and the third information relating to a number of stitches formed per unit length which number is predetermined for the embroidery. The third means is capable of producing sewing data such that the apparent stitch density in a block is substantially uniform with that in one or more blocks adjacent to the block in the embroidery area. The sewing data produced by the present apparatus reflects a degree of deformation of the block from a reference block. Consequently, the embroidery formed by utilizing the sewing data has a uniform stitch density in the respective blocks and therefore enjoys an excellent appearance or high quality.

Furthermore, since the first information relating to the lengths of the first and second straight line segments that intersect each other in the each block, is utilized by the third means, the present apparatus produces sewing data for not only the blocks whose sewing start and end segments are parallel to each other, but also various types of deformed blocks other than those blocks. In addition, the determination of the lengths of the first and second straight line segments is easily carried out. Thus, the present apparatus enjoys improved versatility.

In a preferred embodiment of the present invention, each of the blocks consists of a quadrangle, the sewing start and end segments consisting of opposite sides of the quadrangle of the each block, the first and second points consisting of four vertices of the quadrangle, the first means comprising means for determining, as the lengths of the first and second straight line segments, respective lengths of two diagonals of the quadrangle.

In another embodiment of the present invention, the apparatus further comprises means for obtaining sets of position data each of which is representative of a corresponding one of the first and second points of the each block.

In yet another embodiment of the present invention, the first means comprises means for determining, as the first information, a ratio of one of the lengths of the first and second straight line segments to the other length, the one length being not smaller than the other length. Alternatively, it is possible to use as the first information a difference between the lengths of the first and second straight line segments. The difference is indicative of a degree of deformation of a block, like the above indicated ratio.

According to a feature of the present invention, the third means comprises means for determining a coefficient corresponding to the determined ratio, according to a predetermined relationship between the coefficient and the ratio, and means for storing the relationship. The third means may be adapted to utilize the above indicated ratio directly for producing the sewing data, without determining the coefficient.

According to another feature of the present invention, the relationship indicates that the coefficients of 1/1.0, 1/1.5, 1/2.0, 1/2.5, 1/3.0, and 1/5.0 respectively correspond to the ratios of not less than 1 and less than 2, not less than 2 and less than 5, not less than 5 and less than 9, not less than 9 and less than 13, not less than 13 and less than 17, and not less than 17.

According to yet another feature of the present invention, the third means comprises means for determining a number of stitches, $n_n$, formed to fill the each block, $B_n$, with the stitches, according to a following expression:

$$n_n = K_n \cdot l_n \cdot d$$

where $K_n$; the coefficient for the each block $B_n$, $l_n$; the length of the each block $B_n$ as the second information, and d; the number of stitches per unit length as the third information.

As is apparent from the above indicated expression, coefficient $K_n$ may be used to adjust preliminary stitch number, $n'_n$, obtained by multiplying block length $l_n$ by stitch density d, or alternatively to adjust stitch density d.

According to a further feature of the present invention, the apparatus further comprises means for obtaining sets of position data each of which is representative of a corresponding one of the first and second points of the each block, the third means producing the sewing data by utilizing the sets of position data and the determined number of stitches $n_n$.

In another embodiment of the present invention, the second means comprises means for determining, as the length of the each block, a distance between respective middle points on the sewing start and end segments of the each block, the third means utilizing the determined distance as the second information.

BRIEF DESCRIPTION OF THE DRAWINGS

The above and optional objects, features and advantages of the present invention will be better understood by reading the following detailed description of the presently preferred embodiment of the invention when considered in conjunction with the accompanying drawings, in which.

DETAILED DESCRIPTION OF THE PREFERRED EMBODIMENT

Figure 1:
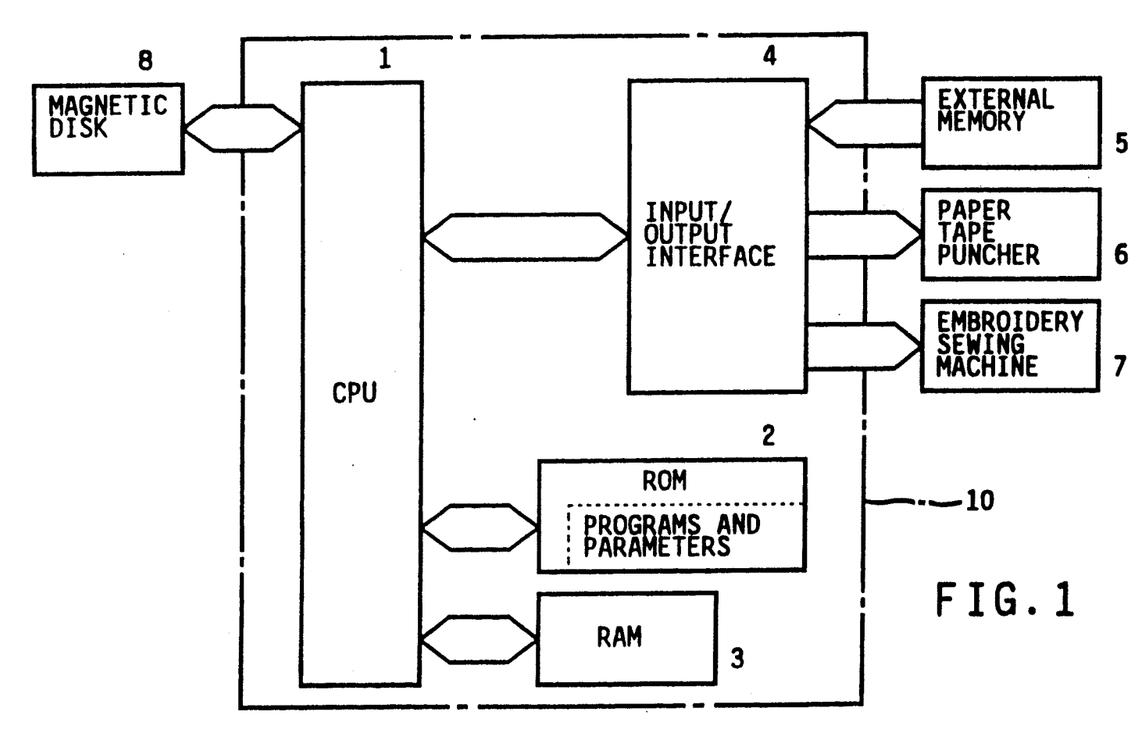
FIG. 1 is a diagrammatic view of the construction of a sewing data processing apparatus embodying the present invention.

Referring to FIG. 1, there is diagrammatically illustrated a sewing data processing apparatus 10 embodying the present invention. In the figure, reference numeral 1 designates a central processing unit (CPU)

which processes sewing data by using various programs and parameters pre-stored in a read only memory (ROM) 2, and utilizing the temporary-storage function of a random access memory (RAM) 3. The CPU 1 generates and receives commands and data to and from external devices via an input/output interface 4.

The external devices include an external memory 5, a paper tape puncher 6, and an embroidery sewing machine 7. The external memory 5 stores data or information necessary to form an embroidery in an area consisting of elementary blocks, on a workfabric. More specifically described, the memory 5 stores sets of position data each of which is representative of the coordinate of a corresponding one of the vertices of quadrangle of each elementary block in the embroidery area. The present apparatus 10 is adapted to deal with quadrangles as blocks for which the apparatus produces sewing data. In addition, the memory 5 stores information indicative of a number of stitches formed per unit length, which number is predetermined for the embroidery. The paper tape puncher 6 produces a punched tape bearing sets of numerical control (NC) data each of which is used to form a stitch for the embroidery.

The CPU 1 reads in the data and information stored in the memory 5, and produces sets of stitch-position data as sewing data necessary for a sewing machine, e.g., the machine 7 to form stitches at respective stitch positions in the blocks of the embroidery area. Each stitch-position data is representative of the coordinate of a corresponding one of the stitch positions at which the respective stitches are formed. Subsequently, the CPU 1 either sends the stitch-position data directly to the embroidery sewing machine 7 to automatically form the embroidery by filling each of the blocks with stitches, or commands the paper tape puncher 6 to produce a punched tape bearing the stitch-position data, which tape may be used in a sewing factory. Alternatively, the CPU 1 may store on a magnetic disk 8 the stitch-position data in the form of NC data. The magnetic disk 8 may be a floppy disk that is removable from the present apparatus.

Figure 2:
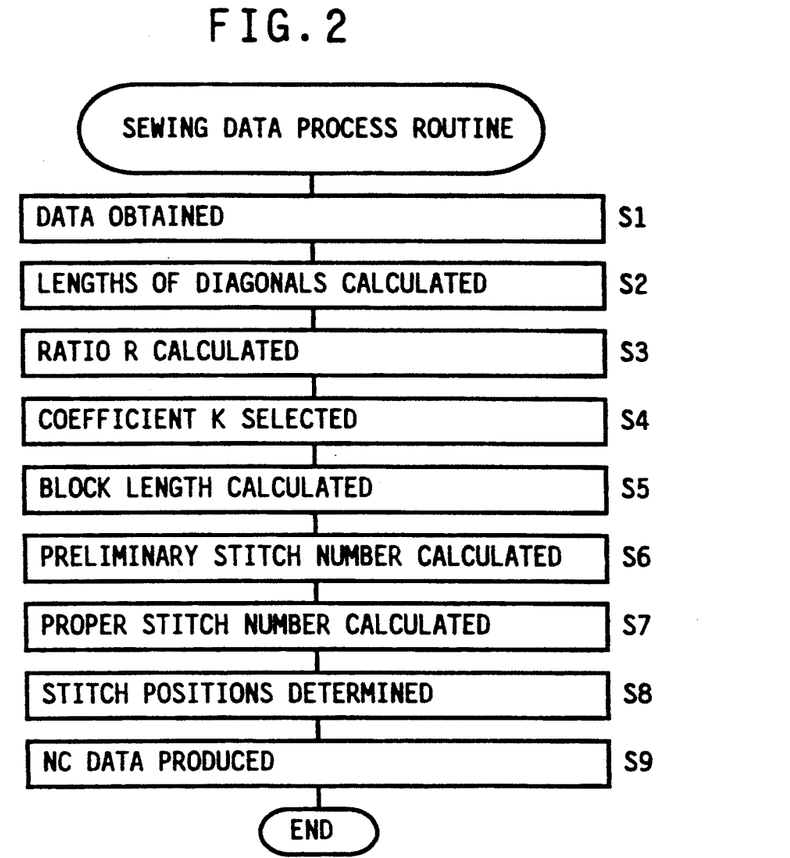
FIG. 2 is a flow chart illustrating a sewing data process program used by the apparatus of FIG. 1.

Hereinafter, there will be described the operation of the present sewing data processing apparatus 10, by reference to the flow chart of FIG. 2.

Figure 4A:
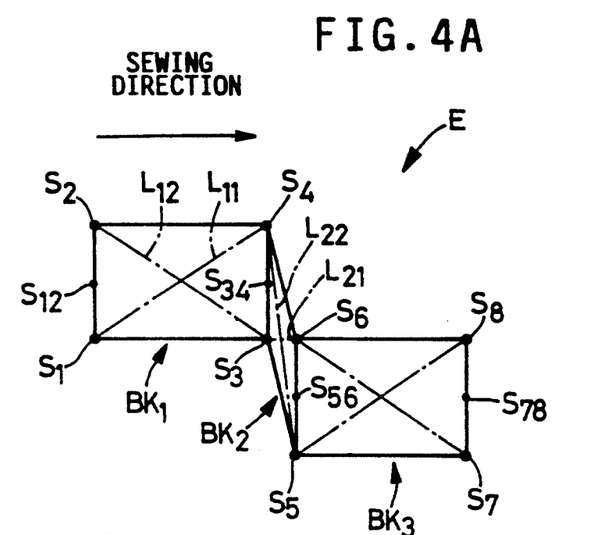
FIG. 4(A) is a view explaining the manner in which the apparatus of FIG. 1 is operated to produce sewing data for an embroidery area.
Figure 4B:
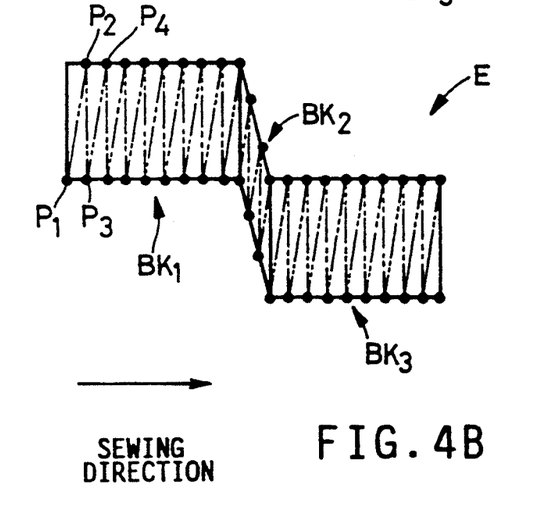
FIG. 4(B) is a view explaining the manner in which the embroidery area of FIG. 4(A) is embroidered according to the sewing data produced by the apparatus of FIG. 1.

Initially, the control of the CPU 1 begins with Step S1 in which, regarding an embroidery area or embroidery E shown in FIGS. 4A and 4B, for example, the CPU 1 reads in, from the external memory 5, the sets of position data for vertices $S_1$, $S_2$, ..., $S_8$ of three quadrangle blocks $BK_1$, $BK_2$, $BK_3$ in area E, and information indicative of the stitch density d predetermined for embroidery E. The sets of position data for vertices $S_1$, $S_2$, ..., $S_8$ are stored in the RAM 3 in the order of description. The information d is also stored in the RAM 3.

Step S1 is followed by Step S2 to calculate respective lengths of two diagonals of each of blocks $BK_1$, $BK_2$, $BK_3$ by utilizing the position data for vertices $S_1$, $S_2$, ..., $S_8$. Step S2 is followed by Step S3 to calculate a ratio R of one of the two lengths of each block, to the other length, subject to the condition that the one length is not smaller than the other length.

Figure 3:
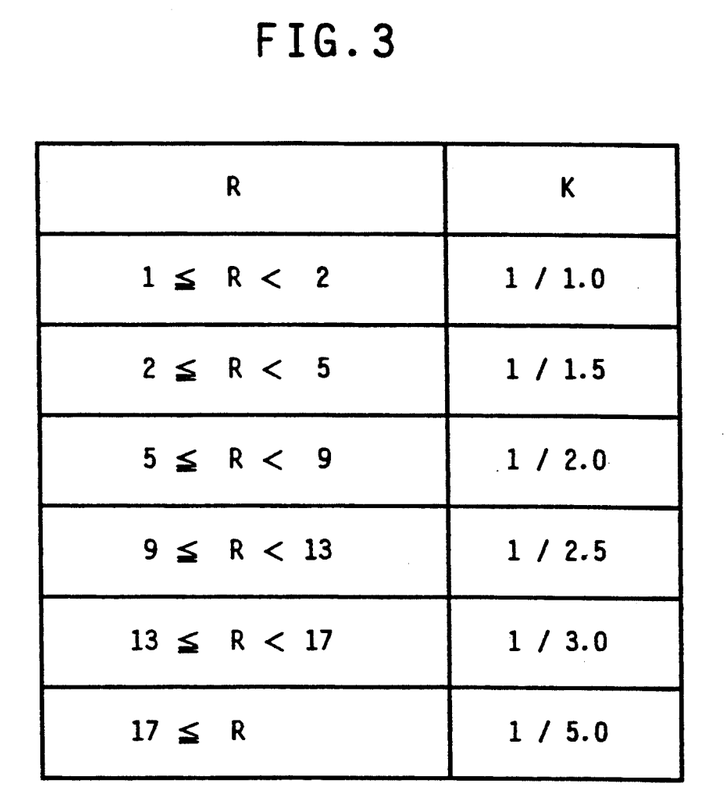
FIG. 3 is a table utilized by the apparatus of FIG. 1.

Subsequently, the control goes to Step S4 to select a coefficient K corresponding to the ratio R determined in Step S3, according to a table as shown in FIG. 3. The table is indicative of a predetermined relationship between ratio R and coefficient K, and is pre-stored in the ROM 2.

Regarding area E of FIG. 4A, the present apparatus shows that first block $BK_1$ has a ratio $R_1=1$ of the length of one diagonal $L_{11}$ to other diagonal $L_{12}$, that second block $BK_2$ has a ratio $R_2=11.7$ of the length of one diagonal $L_{21}$ to other diagonal $L_{22}$, .... Therefore, the apparatus selects coefficient $K_1=1/1.0$ (=1.0) for first block $BK_1$, selects coefficient $K_2=1/2.5$ (=0.4) for second block $BK_2$, ....

Step S4 is followed to Step S5 to determine a length of each block in a sewing direction in which the filling of the each block with stitches is advanced from a sewing start side to a sewing end side of the each block. Hereinafter, this length is referred to as the block length. The sewing start and end sides are a pair of opposite sides of the quadrangle of each block. More specifically described, the CPU 1 determines as the block length the distance between respective middle points on the sewing start and end sides of each block.

Regarding area E of FIG. 4A, the CPU 1 determines, for first block $BK_1$, the distance $S_{12}S_{34}$ between respective middle points $S_{12}$ and $S_{34}$ on sewing start and end sides $S_1S_2$ and $S_3S_4$, determines for second block $BK_2$ the distance $S_{34}S_{56}$ between respective middle points $S_{34}$ and $S_{56}$ on sewing start and end sides $S_3S_4$ and $S_5S_6$, ....

Subsequently, the control goes to Step S6 to preliminarily determine a number of stitches $n'_1$, $n'_2$, ... to be formed in each block, by multiplying the block length of the each block by the stitch density d. Step S6 is followed by Step S7 to determine a proper stitch number $n_1$, $n_2$, ... by multiplying preliminary stitch number $n'_1$, $n'_2$, ... for each block by corresponding coefficient $K_1$, $K_2$, ... determined in Step S4. In calculating a stitch number $n'_n$ or $n_n$, a decimal fraction is treated by counting not less than ½ fractions as one and disregarding the rest. Since ratio R or coefficient K is indicative of a degree of deformation of a block from a reference quadrangle block whose diagonals have the same length, stitch numbers $n_1$, $n_2$, ... properly reflect the degrees of deformation of the corresponding blocks $BK_1$, $BK_2$, ...

Step S7 is followed by Step S8 to determine stitch positions $P_1$, $P_2$, ... on the upper sides $S_2S_4$, ... and the lower sides $S_1S_3$, ... of blocks $BK_1$, ..., as shown in FIG. 4B. Subsequently, in Step S9, the CPU 1 produces sets of NC data representative of the stitch positions $P_1$, $P_2$, ... determined in Step S8, and generates the NC data to the paper tape puncher 6 or magnetic disk 8. Alternatively, the CPU 1 directly commands the sewing machine 7 to form embroidery E.

For example, the sewing machine 7 forms embroidery E as shown in FIG. 4B, on the workfabric, by utilizing the sewing data or NC data produced as described above. As is apparent from the figure, the apparent stitch densities in three blocks $BK_1$, $BK_2$, $BK_3$ are uniform or harmonious with each other, although parallelogram block $BK_2$ is deformed to an appreciable degree as compared with adjacent rectangle blocks $BK_1$ and $BK_3$, which are reference quadrangle blocks. Thus, embroidery E is formed with excellent appearance or high quality.

Figure 6D:
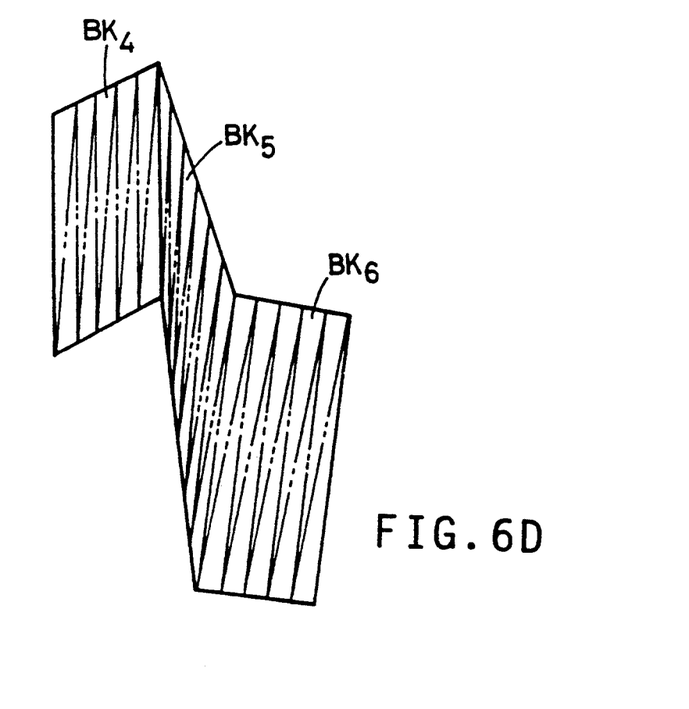
FIG. 6(D) is a view explaining the manner in which the embroidery area of FIG. 6(C) is embroidered according to the sewing data produced by the apparatus of FIG. 1.

While block $BK_2$ of area E is a parallelogram, the present apparatus serves for dealing with deformed quadrangles different from parallelograms. In the event, for example, that the present apparatus is operated for the area of FIG. 6C which consists of parallelogram block $BK_4$, deformed block $BK_5$, and rectangle block $BK_6$, an embroidery is formed in those blocks as shown in FIG. 6D. The present apparatus determines ratio R=about 7 for deformed block $BK_5$ and therefore selects coefficient $K=\frac{1}{2}.0\ (=0.5)$. As can be seen from the embroidery of FIG. 6D formed according to the sewing data produced by the present apparatus, the apparent stitch density in block $BK_5$ is well uniform with that in adjacent block $BK_4$ or $BK_6$. This is in stark contrast to the embroidery formed by the previously identified prior art apparatus. In other words, the present apparatus produces sewing data such that the apparent stitch density in a block is uniform with that in one or more blocks adjacent to the block.

Figure 5A:
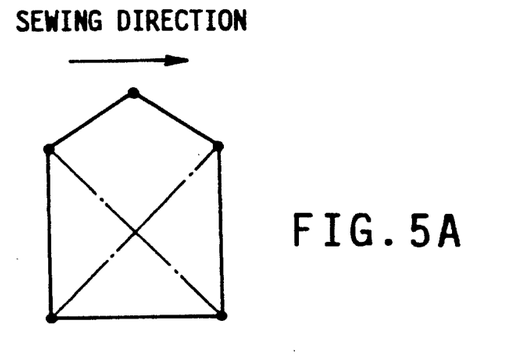
FIG. 5(A) is a view of a block dealt with by another embodiment of the present invention.
Figure 5B:
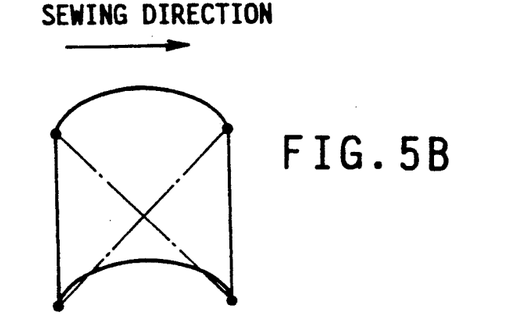
FIG. 5(B) is a view of a block dealt with by yet another embodiment of the present invention.

While the present invention has been described in one embodiment adapted to deal with quadrangle blocks each of which is defined by four straight line segments or sides, the principle of the present invention is applicable to an apparatus which produces sewing data for various types of blocks other than quadrangles. For example, the present invention provides an apparatus capable of dealing with a block shown in FIG. 5A which is defined by more than four (e.g., five) sides, and an apparatus capable of dealing with a block shown in FIG. 5B which is defined by a plurality of segments including one or more curved segments.

While the present invention has been described in its presently preferred embodiment with the details, it is to be understood that the present invention is by no means limited to such details of the illustrated embodiment but may be embodied with various changes, improvements and modifications that may occur to those skilled in the art without departing from the scope and spirit of the invention defined in the appended claims.

What is claimed is:

1. An apparatus for processing sewing data and utilizing the sewing data to sew an embroidery in an area consisting of a plurality of blocks, by filling with stitches each of the blocks in a sewing direction from a sewing start segment toward a sewing end segment, the sewing start and end segments being defined by, and between, a pair of first points and a pair of second points, respectively, the first and second points being positioned on an outline of said each block, the apparatus comprising:

first means for obtaining first information relating to a length of a first straight line segment connecting between one of said two first points defining said sewing start segment and one of said two second points defining said sewing end segment, and a length of a second straight line segment connecting between the other first point and the other second point, said first and second straight line segments intersecting each other;

second means for obtaining second information relating to a length of said each block in said sewing direction in which the filling of said each block with said stitches is advanced from said sewing start segment toward said sewing end segment;

third means for producing said sewing data by utilizing said first information, said second information, and third information representative of a number of stitches formed per unit length which number is predetermined for said embroidery; and data utilization means for utilizing said sewing data to form said stitches.

2. The apparatus according to claim 1, wherein each of said blocks consists of a quadrangle, said start and end segments consisting of opposite sides of the quadrangle of said each block, said pair of first points and sad pair of second points consisting of four vertices of said quadrangle, said first means comprising means for determining, as the lengths of said first and second straight line segments respective lengths of two diagonals of said quadrangle.

3. The apparatus according to claim 1, further comprising means for obtaining sets of position data each of which is representative of a corresponding one of said pair or first points and said pair of second points of said each block.

4. The apparatus according to claim 1, wherein said first means comprises means for determining, as said first information, a ratio of one of the lengths of said first and second straight line segments to the other length, said one length being not smaller than said other length.

5. The apparatus according to claim 4, wherein said third means comprises means for determining a coefficient corresponding to the determined ratio, according to a predetermined relationship between said coefficient and said ratio, and means for storing said relationship.

6. The apparatus according to claim 5, wherein said relationship indicates that the coefficients of 1/1.0, 1/1.5, 1/2.0, 1/2.5, 1/3.0, and 1/5.0 respectively correspond to the ratios of not less than 1 and less than 2, not less than 2 and less than 5, not less than 5 and less than 9, not less than 9 and less than 13, not less than 13 and less than 17, and not less than 17.

7. The apparatus according to claim 5, wherein said third means comprises means for determining a number of stitches, $n_n$, formed to fill said each block, $B_n$, with said stitches, according to a following expression:

$$n_n = K_n \cdot l_n \cdot d$$

where $K_n$; said coefficient for said each block $B_n$, $l_n$; said length of said each block $B_n$ as said second information, and d; said number of stitches per unit length as said third information.

8. The apparatus according to claim 7, further comprising means for obtaining sets of position data each of which is representative of a corresponding one of said pair of first points and said pair of second points of said each block, said third means producing said sewing data by utilizing said sets of position data and the determined number of stitches $n_n$.

9. The apparatus according to claim 1, wherein said second means comprises means for determining, as said length of said each block, a distance between respective middle points on said sewing start and end segments of said each block, said third means utilizing the determined distance as said second information.

* * * * *